United States Patent [19]
Willems et al.

[11] Patent Number: 5,990,485
[45] Date of Patent: Nov. 23, 1999

[54] LABEL FOR CERTIFYING AN INSPECTION BY PENETRATING RADIATION

[75] Inventors: Peter Willems, Stekene; Luc Struye, Mortsel; Paul Leblans, Kontich, all of Belgium

[73] Assignee: Agfa-Gevaert, N.V., Mortsel, Belgium

[21] Appl. No.: 08/974,221

[22] Filed: Nov. 19, 1997

Related U.S. Application Data

[60] Provisional application No. 60/039,693, Feb. 13, 1997.

[30] Foreign Application Priority Data

Nov. 25, 1996 [EP] European Pat. Off. ............. 96203299

[51] Int. Cl.$^6$ ................................ G01J 1/50; G01T 1/24
[52] U.S. Cl. ..................... 250/484.2; 250/483.1; 250/580; 250/474.1; 250/484.3; 250/475.2; 250/337; 250/581; 250/484.5
[58] Field of Search .............. 250/484.2, 483.1, 250/580, 474.1, 484.3, 475.2, 337, 581, 484.5

[56] References Cited

U.S. PATENT DOCUMENTS

| | | |
|---|---|---|
| 4,498,005 | 2/1985 | Oono et al. . |
| 5,084,623 | 1/1992 | Lewis et al. .......................... 250/474.1 |
| 5,264,684 | 11/1993 | Weil ........................................ 235/375 |
| 5,596,199 | 1/1997 | McNulty et al. .................. 250/370.07 |

FOREIGN PATENT DOCUMENTS

| | | |
|---|---|---|
| 0 727 696 A1 | 8/1996 | European Pat. Off. . |
| 59-231465 | 12/1984 | Japan .................. 250/484.5 |
| 1-134286 | 5/1989 | Japan ................ 250/370.07 |
| 1122114 | 5/1988 | U.S.S.R. ............. 250/370.07 |
| 2 242 396 | 10/1991 | United Kingdom . |
| WO 94/16902 | 8/1994 | WIPO . |

*Primary Examiner*—Constantine Hannaher
*Assistant Examiner*—Andrew Israel
*Attorney, Agent, or Firm*—Breiner & Breiner

[57] ABSTRACT

A label is provided, comprising a means wherein penetrating radiation leaves a human- or machine-readable semi-permanent or permanent mark. Preferably said means is a storage phosphor. A method for using such a label for checking if an articles has been inspected by penetrating radiation and a method for using such a label as personal monitoring are also provided.

11 Claims, No Drawings

LABEL FOR CERTIFYING AN INSPECTION BY PENETRATING RADIATION

This application claims benefit of Provisional Appln. Ser. No. 60/039,693 filed Feb. 13, 1997.

FIELD OF THE INVENTION

This invention relates to a method making it possible to check whether an article has been inspected by penetrating radiation. In particular it relates to a method making it possible to check whether if a piece of luggage has been inspected by X-rays.

BACKGROUND OF THE INVENTION

Both in luggage inspection systems in, e.g. airports and in non-destructive testing with penetrating radiation, it is important to provide means and ways whereby it is possible to check whether a given articles has undeniably been inspected. Mostly the inspection with penetrating radiation is secured by means of e.g. forms to be filled out by the inspector, by marking the inspected article, etc. In these cases the marks or forms are not tamperproof and can more or less easily be forged.

In the field of luggage inspection, it has been proposed to wrap the piece of luggage after X-ray inspection with a plastic foil. A machine wherein the inspection and the wrapping of the luggage proceed directly one after another without the luggage leaving the machine, has been disclosed in, e.g., WO 95/030580.

Although this system secures the inspection by X-ray, it is quite expensive and the wrapped pieces of luggage become more difficult to handle.

In WO 94 16902 the application of labelling an object with two different marks, a visible and an invisible one has been disclosed for secure an object against counterfeiting. A label according to that disclosure is not a tamperproof label capable of securing that an object has been inspected by penetrating radiation.

Therefore there is still a need for a cheap, reliable method to secure the inspection of articles by penetrating radiation.

OBJECTS AND SUMMARY OF THE INVENTION

It is an object of the invention to provide a label to be affixed to an article, wherein this label makes it possible to check whether an article has been inspected by penetrating radiation.

It is a further object of the invention to provide a method making it possible to check whether an article has undeniably been inspected by penetrating radiation.

It is another object of the invention to provide a tamperproof method for checking whether an article has been inspected by penetrating radiation.

Further objects and advantages of the invention will become clear from the detailed description hereinafter.

The objects of the invention are realised by providing a label for monitoring the exposure to penetrating radiation of an object or a person characterised in that said further comprises a means wherein said penetrating radiation leaves a human- or machine-readable semi-permanent or permanent mark.

The objects of the invention are further realised by providing a method making it possible to check whether an article has been inspected by penetrating radiation, comprising the steps of:

i) providing said article with a means wherein said penetrating radiation leaves a human- or machine-readable semi-permanent or permanent mark, ii) irradiating said article provided with said means, with penetrating radiation, in such a way that both said article and said means are irradiated, and iii) checking if said mark is present.

DETAILED DESCRIPTION OF THE INVENTION

The problem of securing that an article has been inspected by using penetrating radiation (by penetrating radiation is to be understood X-rays, gamma rays, synchroton radiation, etc.) exists in the area of non-destructive-testing as well as in the area of security checking of luggage at airports, ports, etc. Up until now the certification of an inspection by penetrating radiation is done by several means, e.g. the object that has been inspected can go accompanied by a certificate, the inspection of an object can be noted in a kind of logbook, etc. These solutions have all in common that the certification proceeds by means that can not undeniably certify that an object has been subjected to inspection by penetrating radiation. It has been found that it was possible to provide an undeniable proof of inspection by penetrating radiation when the article to be inspected is provided with a means wherein the penetrating radiation can leave a permanent or semi-permanent mark and wherein said mark can not or only with very large efforts be produced by other means than by penetrating radiation. The means wherein the penetrating radiation leaves a semi-permanent or permanent mark are preferably means for storing energy (in any form) from the penetrating radiation, wherein this stored energy can be read to control that the article has been irradiated or not.

The present invention encompasses also a method making it possible to check whether an article has been inspected by penetrating radiation, comprising the steps of:

i) providing said article with a label comprising a means wherein said penetrating radiation leaves a human- or machine-readable semi-permanent or permanent mark, ii) irradiating said article provided with said label, with penetrating radiation, in such a way that both said article and said label are irradiated, and iii) checking if said mark is present.

The method of this invention is quite different from the methods used to incorporate patient identification means in the X-ray screens. Such methods have been disclosed in, e.g., EP-A 727 696, U.S. Pat. No. 4,498,005, wherein the identification mark is brought in the screen by various means, but where the screen is not used to secure the X-raying of an object or of a patient.

A First Embodiment of the Invention

In a first embodiment of the present invention, said means for storing energy of penetrating radiation are storage phosphors. Storage phosphors are inorganic substances that upon irradiation by penetrating radiation absorb energy of the penetrating radiation and store a portion of said energy. The stored energy can then later on be detected by irradiating said storage phosphor (stimulating said phosphor) by electromagnetic radiation with wavelengths ranging from 300 nm to 1200 nm (i.e. by stimulation light) or by heating said phosphor. Upon said irradiation or heating all or a portion of the energy stored in the storage phosphor is released as electromagnetic radiation (e.g., Ultraviolet (UV) light, visible light, and Infrared (IR) light). This electromagnetic radiation, further on called "fluorescent light", can then be detected.

In a storage phosphor the absorbed energy of the penetrating radiation changes the electronic state of the storage phosphors and this change is at least partly conserved until the phosphor is stimulated. Thus, when a stimulable (storage) phosphor is used as a means wherein said penetrating radiation leaves a human- or machine-readable semi-permanent or permanent mark, said mark is a change of the electronic state caused by said penetrating radiation in said storage phosphor.

Heat stimulable phosphors, useful in the present invention are, e.g., SrS:Ce,Sm; SrS:Eu,Sm; etc., as disclosed in U.S. Pat. No. 3,859,527 or LiF:Mg,Ti available from Harshaw Chemical Company, Cleveland, Ohio, USA.

Light stimulable storage phosphors also called stimulable phosphors, photostimulable phosphors, are well known in the art of medical radiography. A system for radiography, using storage phosphors, has been described in U.S. Pat. No. 4,239,968 where a method is claimed for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, wherein said phosphor is an alkaline earth metal fluorohalide phosphor represented by the formula: $(Ba_{1-x}M_x'')FX:yA$ wherein $M''$ is one or more of Mg, Ca, Sr, Zn and Cd; X is one or more of Br, Cl or I A is at least one member of the group consisting of Eu, Tb, Ce, Tm, Dy, Pr, Ho, Nd, Yb and Er; and x is in the range $0 \leq x \leq 0.6$ and y is in the range $0 \leq y \leq 0.2$, and that the wavelength of said stimulating rays is not less than 500 nm.

Any variant of alkaline earth metal fluorohalide stimulable phosphor is useful in the present invention. Typical examples of such stimulable phosphors are given below, without however limiting the bariumfluorohalide useful in the present invention to these examples.

In EP-A 345 903 a phosphor has been disclosed with formula $Ba_{1-x}Sr_xF_{2-a-b}Br_aX_b:zA$, wherein X is at least one member selected from the group consisting of Cl and I; x is in the range $0.10 \leq x \leq 0.55$; a is in the range $0.70 \leq a \leq 0.96$; b is in the range $0 \leq b < 0.15$ ; z is in the range $10^{-7} \leq z \leq 0.15$, and A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine.

In U.S. Pat. No. 4,261,854 a phosphor is disclosed with formula BaFX:xCe,yA wherein $0 < x \leq 2\ 10^{-1}$ en $0 \leq y \leq 5\ 10^{-3}$.

In U.S. Pat. No. 4,336,154 a phosphor is disclosed with formula $(Ba_{1-x}M^{2+}_x)F_2.aBaX_2:yEuzB$, wherein $0.5 \leq a \leq 1.25$; $0 \leq x \leq 1\ 10^{-6} \leq y \leq 2\ 10^{-1}$; $0 < z \leq 2\ 10^{-1}$.

In EP-A 704 511 a stimulable bariumfluorohalide is disclosed with formula $Ba_{1-x-y''-z-r}Sr_xPb_{y''}Cs_zEu_rF_{2-a-b}Br_aI_b$, wherein $0 \leq x \leq 0.30$, $10^{-4} < y'' < 10^{-3}$, $10^{-7} < z < 0.15$, $0 \leq r < 0.05$, $0.75 \leq a+b \leq 1.00$, $0.05 < b < 0.20$.

In European application 96202816.3 filed on Oct. 10, 1996 a stimulable phosphor has been disclosed with formula $Ba_{1-x-y-p-3q-z}Sr_xM_y^{2+}M_{2p}^{1+}M_{2q}^{3+}F_{2-a-b}Br_aI_b:zEu$, wherein $M^{1+}$ is at least one alkali metal selected from the group consisting of Li, Na, K, Rb and Cs; $M^{2+}$ is at least one divalent metal selected from the group consisting of Ca, Mg and Pb; $M^{3+}$ is at least one trivalent metal selected from the group consisting of Al, Ga, In, Tl, Sb, Bi, Y, La, Ce, Pr, Nd, Sm, Gd, Tb, Dy, Ho, Er, Tm, Yb and Lu; $0 \leq x \leq 0.30$, $0 \leq y \leq 0.10$, $0 \leq p \leq 0.3$, $0 \leq q \leq 0.1$, $0.05 \leq a \leq 0.76$, $0.20 \leq b < 0.90$, $a+b < 1.00$ and $10^{-6} \leq z \leq 0.2$.

Not only bariumfluorohalide storage phosphors can be used in this invention, but also halosilicate phosphors as disclosed in, e.g., EP 304 121, EP 382 295 and EP 522 619.

Although any stimulable (storage) phosphor known in the art is useful in a label according to the present invention it is preferred to use stimulable phosphors with slow dark decay. A storage phosphor, having stored energy after being exposed to penetrating radiation, releases (part) of the stored energy as stimulated light upon stimulation with stimulation light, as explained above. A storage phosphor, having stored energy after being exposed to penetrating radiation, can release said stored energy also without irradiation with stimulation light. This latter way of releasing energy is called the "dark decay".

The dark decay is measured by irradiating a phosphor by penetrating radiation of 70 kVp, and, immediately after said irradiation, stimulating said phosphor by a He—Ne laser of 30 mW. The fluorescent light emitted by the phosphor upon stimulation is collected and brought to a photomultiplier (Hamamatsu R 376) giving a corresponding electrical current, proportional to the amount of emitted fluorescent light. This give the initial value of the amount of fluorescent light.

The irradiation of the phosphor with penetrating radiation is repeated, but the reading of the amount of stimulable light for a given intensity of stimulating energy only take place after keeping the irradiated phosphor for a given time in the dark. This process is repeated and the time after which the emitted fluorescent light, (and thus the energy remaining in the phosphor) of a phosphor kept in the dark, has fallen to 1/e is recorded as "dark decay". A storage phosphor, for use in the first embodiment of this invention, has preferably a dark decay longer than 120 minutes.

The energy stored in a storage (stimulable) phosphor can be erased by irradiation by ambient light, depending on the chemical formula and/or the preparation modalities of the storage phosphor, the stored energy is less of more easily erased. This phenomenon is further on termed "erasability". A storage phosphor for use in the present invention has preferably both a low "erasability" and a slow dark decay, i.e. it keeps the stored energy for a long time when the phosphor is kept in the dark. The use of such a storage phosphor presents the advantage that it is possible to certify the inspection of an object by penetrating radiation, whereto a label, according to this invention, is affixed a fairly long time (hours, days) after said inspection.

Storage phosphors, both heat stimulable phosphors and light stimulable phosphor, having slow dark decay are, e.g. phosphors with formula : SrS:EU,Sm; $Ba_{1-x}Sr_xF_{2-a-b}Br_aX_b:Eu^{2+}$, wherein X is at least one halogen selected from of Cl and I, $0 \leq x \leq 0.3$ and 2-a-b>1; $Ba_{1-x}Sr_xFCl$, wherein $0 \leq x \leq 0.3$; $Cs_2NaYF_6$; alkalihalides as e.g. $RbBr:Ga^{1+}$.

A storage phosphor for use in the present invention can have been applied to said label from a powder of phosphor. In this case the powder comprises phosphor particles having a particles size distribution with an average volume diameter ($d_{v50}$) between 1 and 100 $\mu$m The amount of storage phosphor present on a label according to the present invention can in the case of a powder of phosphor range from 10 mg/cm² to 400 mg/cm², preferably the amount of phosphor ranges 20 mg/cm² to 200 mg/cm². The storage phosphor can be present on a label according to this invention as a single crystal.

The storage phosphor can be present on one or both surfaces of a label, it can occupy an entire surface of a label according to this invention, or only a portion of said surface. Preferably on a label according to the present invention a patch of phosphor having a surface between 1 mm² and 10 cm² is present. More preferably said patch of phosphor has a surface between 100 mm² and 5 cm².

In a preferred implementation of the first embodiment of this invention, the storage phosphor on the label is covered with a light tight covering that can be removed when it is necessary to check whether energy has been stored in said storage phosphor or not. The covering can be a light tight film strip that is adhered to the phosphor and that can easily be peeled away without damaging the phosphor. It can be a cover that can be pushed away for reading. This light tight covering of the phosphor offers the advantage that the a storage phosphor with high "erasability" but with slow "dark decay" can be used in the present invention.

Checking whether or not a label, according to this invention, comprising a storage phosphor and being affixed to an object, has been exposed to penetrating radiation proceeds by irradiating said phosphor with stimulating light and by reading the stimulated light. The reading preferably proceeds by stimulating the stimulable phosphor by stimulating light.

The stimulating light is preferably laser light-or light produced by LED's. When using LED's, the use of high brightness Red LED's made with AlGaAs is preferred. Any laser known in the art can be used in this invention for stimulating a stimulable phosphor, preferably a laser emitting light with a wavelength above 450 nm is used. Typical examples of such lasers are, e.g., an Ar-laser (488 and 514 nm), a frequency doubled Nd-YAG laser (532 nm), a He—Ne laser (632 nm), a Kr-laser (648 nm), diode lasers, semiconductor lasers (GaAs laser), etc.

It is preferred in the present invention to use a stimulable phosphor that can be stimulated by semiconductor or diode laser. When using such a phosphor a small laser can be used in the reader and the reader can be constructed such as to be a hand-held device. Very useful phosphors, being stimulable with a laser with small dimensions or by a small heating source, are, e.g. SrS:EU,Sm; $Ba_{1-x-y}Sr_xCa_yF_{2-a-b}Br_aI_b:Eu^{2+}$, wherein x.y>0, $0.1 \leq b \leq 1.00$ and, preferably, 2-a-b>1.

During stimulation of the stimulable phosphor, stimulated light is emitted when the phosphor has been exposed to X-rays. The detection of this stimulated light certifies, in the present invention, whether or not an item (article), whereon a label according to this invention has been affixed, has been exposed to penetrating radiation. The detection of the stimulated light can proceed by the human eye, which is the most simple way or by a light detector, e.g., a photomultiplier. In the latter case, the stimulated light is collected by optical means, preferably optical fibres, and brought to the entrance of a photomultiplier.

The light is converted in electrons and the current and/or voltage of the photo-electrons generated in the photomultiplier can be measured or used to light, e.g. a small diode. A reading device for reading a label according to this invention can be constructed as a hand-held device. Such a reader comprises then a small stimulating source (a light source or a heat source) to stimulate the stimulable phosphor, collecting means for the stimulated light bringing it at the entrance of a photomultiplier. The stream of electrons generated in said photomultiplier is then, e.g. used to light a LED. Thus when the LED lights, the label according to the present invention has been exposed to penetrating radiation.

It is clear that, although an hand-held reader is a preferred implementation for a reader in the first embodiment of this invention, larger readers (e.g. table-top readers) can also be used.

When stimulable phosphor on a label according to the first embodiment of the invention is intended to be read by a larger reader (e.g. a table-top reader) it can be useful to have a label with at least one separable portion, e.g., attached to the others portion(s) of the label via a tear strip. On that separable portion the stimulable phosphor is present and that portion can, after tearing it apart from the portion of the label attached to the inspected object, be inserted in the table-top reader for checking whether the label has be irradiated with penetrating radiation.

A label according to the first embodiment of this invention can beneficially be used as means for personal monitoring. When a person working in an environment with penetrating radiation carries such a label, the label can be used to determine the dose of penetrating radiation absorbed by that person. The amount of energy of the penetrating radiation stored in the phosphor is proportional to the absorbed dose and can be read out and the remaining amount of energy stored in the phosphor can be erased by erasing radiation. It was found that the ease of erasure was related to the energy of the penetrating radiation that irradiated the label. E.g. energy stored in the label by irradiation with Co60 (1 MeV) radiation is less easily erased than the energy stored in the label by irradiation with penetrating radiation of 50 keV. Thus the time needed to erase the amount of energy stored in the phosphor to a given level is a function of the energy of the penetrating radiation that left said amount of energy stored in the phosphor and by checking the amount of energy left in the phosphor after a given time the energy of the penetrating radiation can be determined. It is clear that for each type of storage phosphor used in the label a calibration of the readings both to determination of the amount of energy stored and to the determination of the energy of the radiation causing the amount of energy to be stored has to be performed. This can easily be done by irradiating the label with a known dose of penetrating radiation of known energy and reading out the amount of energy stored in the phosphor (this is proportional to the absorbed dose) and erasing the amount of energy stored in the phosphor and controlling at given time intervals the amount of energy left in the phosphor (this is proportional to the energy of the penetrating radiation to which the label with the phosphor has been exposed). The phosphor can be calibrated so that the energy of the penetrating radiation can be assessed by reading the time needed to reach an erasure depth (erasure depth: the degree to which the amount of energy stored has been erased.). Therefore the invention encompasses a method for personal monitoring comprising the steps of:

providing a person entering an area where penetrating radiation is used with a label comprising a storage phosphor wherein an amount of energy of said penetrating radiation, proportional to a dose absorbed by said phosphor is stored, reading out said amount of energy stored in said phosphor, assessing said absorbed dose, while leaving a fraction of said stored energy in said phosphor, erasing said fraction of said stored energy from said phosphor by overall exposure to erasing radiation during an erasing time to reach a predetermined erasure depth, and noting said erasure time.

In a label according to the first embodiment of this invention and used for personal monitoring it is possible to incorporate different phosphors for the detection of penetrating radiation of different energy. It is, e.g. possible to include in the label a first patch of phosphor dedicated to the detection of Co60 radiation, a second patch of phosphor dedicated to the detection of Ir192 radiation, a third patch of phosphor dedicated to the detection of radiation of X-ray between 50 and 400 keV, a fourth patch of phosphor dedicated to the detection of ultraviolet radiation. It is also possible to cover a label, according to the first embodiment of the invention and used for personal monitoring, wherein only one type of phosphor is present with different filters so that, e.g., on one patch of the phosphor a filter letting only Co60 radiation pass is present, on a second patch a filter letting only Ir192 radiation pass, on a third patch a filter letting only pass X-rays with energy between 50 and 400 keV, etc.

A Second Embodiment of the Invention

In a second embodiment of this invention, the means for storing energy of penetrating radiation are means that convert the energy of the absorbed penetrating radiation in to electrons and these electrons are stored in an electronic memory that can repeatedly be read out.

Means for converting the energy of the absorbed penetrating radiation in to electrons In a first implementation of the second embodiment of this invention, a direct or prompt emitting phosphor (i.e. a phosphor that upon exposure to penetrating radiation directly emits electromagnetic radiation with a wavelength between 300 nm and 800 nm is combined with a photo diode or a light sensitive CCD. The combination of a prompt emitting phosphor and a photo diode is a preferred implementation of this second embodiment of the present invention. Upon irradiation of the direct emitting phosphor, this phosphor emits light that is converted to electrons by photo diode.

Any prompt emitting phosphor known in the art can be used in this second implementation of the second embodiment of the present invention. Typical direct emitting phosphors useful according to the present invention are, e.g., $CaWO_4$, metaltantalate phosphors, wherein metal stands for Y, Gd, Lu, etc. and the preparation of which is described in, e.g., EP-A 011 909, EP-A 202 875 and in U.S. Pat. No. 5,064,729, barium fluorobromide phosphors, the preparation of which proceeds analogously to the preparation of barium fluorochloride phosphors described e.g. in GB 1,161,871 and 1,254,271 and in U.S. Pat. No. 4,088,894, $Gd_2O_2S$, LaOX wherein X is chlorine or bromine, $BaSO_4:Eu^{2+}$, CsI:Na, CsI:Tl, $Y_2O_2S:Eu^{3+}$, $Ba_3(PO_4)_2:Eu^{2+}$, In a second implementation of the second embodiment of the present invention, said means that convert the energy of the absorbed penetrating radiation in to electrons, are röntgen CCD's, i.e. charge coupled devices that are sensitive to penetrating radiation. Useful röntgen CCD's are, e.g. CCD'S of the S3901-FX SERIES (trade name) from Hamamatsu, Japan, these CCD's are basically sensitive to penetrating radiation with energy between 10 and 100 kev.

Other röntgen detectors, useful for the second implementation of the second embodiment of this invention, providing a current of electrons after irradiation by penetrating radiation are, e.g., selenium based detectors as describe in e.g. U.S. Pat. No. 5,132,541, or thick films of amorphous selenium, polycrystalline ZnS, AsSe or other calcogenide glasses as described in U.S. Pat. No. 5,017,989, a-Si detectors, etc.

When using the second embodiment of the present invention, the electrons generated by the exposure to X-rays are stored in an electronic memory, e.g. magnetic memory. This magnetic memory is both readable and erasable and thus a label according to the second embodiment of the invention is basically reusable after erasure. The magnetic memory can be in the form of a magnetic strip, and can also be read by a hand-held magnetic reader. The memory can also be an EEPROM, commercially available from, e.g., Motorola, Texas Instruments, Catalyst Semiconductor, etc.

Although a read only memory will exclude the accidental or purposeful erasure of the memory, a magnetic memory is preferred the second embodiment of the invention, an accidental erasure of the memory will only entail an other inspection with penetrating radiation, but will not result in a false certification of the inspection.

When a label according to the second embodiment of the invention is intended to be read by a larger reader (e.g. a table-top reader) it can be useful to have a label with at least one separable portion, e.g., attached to the others portion(s) of the label via a tearstrip. On that separable portion the means wherein penetrating radiation can leave a mark are present and that portion can, after tearing it apart from the portion of the label attached to the inspected object, be inserted in the table-top reader for checking whether the label has be irradiated with penetrating radiation.

Within the scope of this invention are also labels comprising means that upon exposure to penetrating radiation discolour, colour, deform or in any other get marked by said penetrating radiation.

A label according to the present invention can be affixed to the article to be inspected by any means known in the art: it can comprise an adhesive layer (thermoadhesive, self-adhesive, etc.) or binding means, e.g. a string, a small chain, a rubber band, clips etc. It can be affixed to the article by stapling. It can be affixed in such a way that it can be easily separated from the article to which it is affixed or it can be permanently affixed to said article and thus form an integral part of the articles to be inspected.

When used in personal monitoring the label can be affixed by the means described immediately above to the clothing of a person, or can be carried along by that person. Also for use in personal monitoring, it is possible to affix a label, according to this invention—preferably to the first embodiment of this invention—, to a piece of clothing or protecting gear worn by the person working in the environment wherein the risk of exposure to penetrating radiation exists.

The means wherein said penetrating radiation leaves a human- or machine-readable semi-permanent or permanent mark can within the scope of the present invention also be incorporated in the object to be inspected. E.g., it can be an integral part of a piece of luggage. Therefore, the present invention, encompasses also an article incorporating as an integral part of it a means wherein penetrating radiation leaves a human- or machine-readable semi-permanent or permanent mark. In that case it is preferred to use a means wherein penetrating radiation leaves an erasable mark. Thus it is preferred to use either a storage phosphor with high "erasability" and with slow "dark decay" as disclosed in the first embodiment of the present invention or a magnetic erasable memory as disclosed in the second embodiment of the present invention.

When said means wherein said penetrating radiation leaves a human- or machine-readable semi-permanent or permanent mark are comprised in a label according to this invention, said label may further comprise security features making the label still more tamperproof. Such security features are well known in the art inclusions of materials in the bulk of the paper, e.g. watermarks, special relief pattern on the paper surface, fibres, security threads, light diffraction marks, etc. A label according to the present invention is not only useful for checking whether an article has been exposed to penetrating radiation, but can also be very useful for an automatic separation of exposed and non-exposed articles. Therefore the checking whether the mark, left by penetrating radiation, is present proceeds by an automatic reader and the result of the reading is used to actuate separation means, so that exposed and non-exposed articles, provided with a label according to the present invention, can automatically be separated.

The present invention encompasses also a method making it possible to check whether an article has been inspected by penetrating radiation, comprising the steps of:

i) providing said article with means wherein said penetrating radiation leaves a human- or machine-readable semi-permanent or permanent mark, ii) irradiating said article provided with said means, with penetrating radiation, in such a way that both said article and said means are irradiated, and iii) checking if said mark is present.

In a first embodiment of this method, said means wherein said penetrating radiation leaves a human- or machine-readable semi-permanent or permanent mark, comprise a photostimulable or heat stimulable compound.

The method according to this invention can, when the means wherein said penetrating radiation leaves a human- or machine-readable semi-permanent or permanent mark, comprise a heat stimulable compound, beneficially be executed when the step of checking if said mark is present comprises the steps of:

i) heating said storage means, releasing fluorescent visible light and ii) detecting said fluorescent light.

When said means wherein said penetrating radiation leaves a human- or machine-readable semi-permanent or permanent mark, comprise a photostimulable compound, beneficially be executed when the step of checking if said mark is present comprises the steps of:

i) scanning said storage means with stimulating light, releasing fluorescent light with lower wavelength than said stimulating light and ii) detecting said fluorescent light.

The detection of the fluorescent light, can in the method according to this invention proceed by the human eye or by an optical system comprising a photomultiplier.

When a photostimulable compound is used a means wherein said penetrating radiation leaves a human- or machine-readable semi-permanent or permanent mark, the scanning with stimulating light proceeds with a hand-held reader comprising a source emitting stimulating light, means for collecting stimulated fluorescent light produced by said scanning, means for feeding said collected light in a photomultiplier, means for indicating an electron stream through said photomultiplier.

In a second embodiment of this method, said means wherein said penetrating radiation leaves a human- or machine-readable semi-permanent or permanent mark, comprise a prompt emitting phosphor combined with a photo diode or a light sensitive CCD and an electronic memory. In this case the checking if said mark is present proceeds by reading said electronic memory.

We claim:

1. A label for monitoring the exposure to penetrating radiation of an object or a person wherein said label comprises a storage phosphor having a dark decay longer than 120 minutes wherein said penetrating radiation leaves a human- or machine-readable semi-permanent or permanent mark.

2. A label according to claim 1, being an integral part of an article to be inspected.

3. A method for personal monitoring comprising the steps of providing a person entering an area where penetrating radiation is used with a label comprising a storage phosphor having a dark decay longer than 120 minutes, wherein an amount of energy of said penetrating radiation, proportional to a dose absorbed by said phosphor is stored, reading out said amount of energy stored in said phosphor, assessing said absorbed dose, while leaving a fraction of said stored energy in said phosphor, erasing said fraction of said stored energy from said phosphor by overall exposure to erasing radiation during an erasing time to reach a predetermined erasure depth, and noting said erasure time.

4. A method for checking whether an article has been inspected by penetrating radiation, comprising the steps of:

i) providing said article with a storage phosphor having a dark decay longer than 120 minutes and being selected form the group consisting of photostimulable compounds and heat stimulable compounds, wherein said penetrating radiation leaves a human- or machine-readable semi-permanent or permanent mark, ii) irradiating said article provided with said phosphor, with penetrating radiation, in such a way that both said article and said means are irradiated, and iii) checking if said mark is present.

5. A method according to claim 4, wherein said checking if said mark is present comprises the steps of:

i) heating said storage phosphor, releasing fluorescent light and ii) detecting said fluorescent light.

6. A method according to claim 4, wherein reading of an energy comprises the steps of:

i) scanning said storage phosphor with stimulating light, releasing fluorescent light and ii) detecting said fluorescent light.

7. A method according to claim 5, wherein said detecting of said light proceeds by a human eye.

8. A method according to claim 6, wherein said detecting of said light proceeds by a human eye.

9. A method according to claim 5, wherein said detecting of said light proceeds by an optical system comprising a photomultiplier.

10. A method according to claim 6, wherein said detecting of said light proceeds by an optical system comprising a photomultiplier.

11. A method according to claim 6, wherein said scanning proceeds with a hand-held reader comprising a source emitting stimulating light, means for collecting stimulated fluorescent light produced by said scanning, means for feeding said collected light in a photomultiplier, means for indicating an electron stream through said photomultiplier.

* * * * *